United States Patent
Benson et al.

(10) Patent No.: US 12,477,593 B2
(45) Date of Patent: Nov. 18, 2025

(54) TO CORE NETWORK FUNCTIONS

(71) Applicant: Alianza, Inc., Pleasant Grove, UT (US)

(72) Inventors: Leland Douglas Benson, Louisville, CO (US); David Reekie, Enfield (GB); Benjamin Thomas Wright, Enfield (GB); Matthew Ian Ronald Williams, Enfield (GB); Richard Hewitt, Enfield (GB)

(73) Assignee: Alianza, Inc., Pleasant Grove, UT (US)

( * ) Notice: Subject to any disclaimer, the term of this patent is extended or adjusted under 35 U.S.C. 154(b) by 992 days.

(21) Appl. No.: 17/526,888

(22) Filed: Nov. 15, 2021

(65) Prior Publication Data

US 2022/0183085 A1 Jun. 9, 2022

Related U.S. Application Data

(63) Continuation of application No. 16/923,761, filed on Jul. 8, 2020, now Pat. No. 11,206,698, which is a
(Continued)

(30) Foreign Application Priority Data

May 22, 2019 (GB) ...................................... 1907196

(51) Int. Cl.
*H04W 76/10* (2018.01)
*H04M 15/00* (2006.01)
(Continued)

(52) U.S. Cl.
CPC ........... *H04W 76/10* (2018.02); *H04M 15/66* (2013.01); *H04W 8/18* (2013.01); *H04W 48/16* (2013.01);
(Continued)

(58) Field of Classification Search
CPC ....... H04W 76/10; H04W 8/18; H04W 48/16; H04W 72/04; H04M 15/66
(Continued)

(56) References Cited

U.S. PATENT DOCUMENTS 10,448,268 B1 * 10/2019 Jaya ...................... H04W 76/19
2019/0053105 A1 * 2/2019 Park .................... H04W 36/144
(Continued)

FOREIGN PATENT DOCUMENTS

DK 3697062 T3 8/2022
ES 2886254 T3 12/2021

OTHER PUBLICATIONS

Office Action Received for European Application No. 20156109.9, mailed on Oct. 20, 2023, 9 pages.
(Continued)

*Primary Examiner* — Chuck Huynh
(74) *Attorney, Agent, or Firm* — Keller Preece PLLC

(57) ABSTRACT

In one aspect, a control plane Interworking Function (IWF-C) is used to establish a Packet Data Unit (PDU) session in a data communications network. A create session request is received, for example from a Mobile Management Entity (MME). A create session management context request is generated by the IWF-C and transmitted to a Session Management Function (SMF). A create session management context request response is received from the SMF. A create session request response is generated by the IWF-C and sent, for example to the MME. In other aspects, control plane policy interworking and user plane interworking is provided between components of 4G and 5G networks.

20 Claims, 11 Drawing Sheets

Related U.S. Application Data continuation of application No. 16/784,573, filed on Feb. 7, 2020, now Pat. No. 11,129,212.

(60) Provisional application No. 62/803,081, filed on Feb. 8, 2019.

(51) Int. Cl.
  *H04W 8/18* (2009.01)
  *H04W 48/16* (2009.01)
  *H04W 72/04* (2023.01)
  *H04W 84/04* (2009.01)
  *H04W 88/16* (2009.01)

(52) U.S. Cl.
  CPC .......... *H04W 72/04* (2013.01); *H04W 84/042* (2013.01); *H04W 88/16* (2013.01)

(58) Field of Classification Search
  USPC ....................................................... 455/450
  See application file for complete search history.

(56) References Cited

U.S. PATENT DOCUMENTS

| | | | |
|---|---|---|---|
| 2019/0207778 A1* | 7/2019 | Qiao | .................... H04W 76/12 |
| 2022/0183085 A1 | 6/2022 | Benson et al. | |

OTHER PUBLICATIONS

"Office Action Issued in European Patent Application No. 20156109.9", Mailed Date: Dec. 23, 2021, 5 Pages.
"Search Report Issued in United Kingdom Patent Application No. 2005884.8", Mailed Date: May 5, 2020, 4 Pages.
"Search Report Issued in United Kingdom Patent Application No. 1907196.8", Mailed Date: Aug. 8, 2019, 6 Pages.
"Search Report Issued in United Kingdom Patent Application No. 1907196.8", Mailed Date: Oct. 7, 2019, 4 Pages.
"Notice of Allowance Issued in United Kingdom Patent Application No. 2005884.8", Mailed Date: Jan. 26, 2021, 2 Pages.
"Notice of Allowance Issued in United Kingdom Patent Application No. 2005884.8", Mailed Date: Nov. 27, 2020, 2 Pages.
"Notice of Allowance Issued in United Kingdom Patent Application No. 1917127.1", Mailed Date: Jan. 26, 2021, 2 Pages.
"Notice of Allowance Issued in United Kingdom Patent Application No. 1917127.1", Mailed Date: Nov. 27, 2020, 2 Pages.
"Notice of Allowance Issued in United Kingdom Patent Application No. 1907196.8", Mailed Date: Jan. 26, 2021, 2 Pages.
"Notice of Allowance Issued in United Kingdom Patent Application No. 1907196.8", Mailed Date: Nov. 30, 2020, 2 Pages.

* cited by examiner

TO CORE NETWORK FUNCTIONS

CROSS-REFERENCE TO RELATED APPLICATIONS

This application is a continuation of U.S. application Ser. No. 16/784,573, filed Feb. 7, 2020, which claims the benefit of U.S. Provisional Application No. 62/803,081, filed Feb. 8, 2019, and claims priority to GB Application No. 1907196.8, filed May 22, 2019, under 35 U.S.C. § 119(a). Each of the above-referenced patent applications is incorporated by reference in its entirety.

BACKGROUND OF THE INVENTION

Field of the Invention

The present invention relates to a method of and systems for processing a Packet Data Unit (PDU) session in a data communications network and has particular, but not exclusive, application to establishing and modifying PDU sessions in $5^{th}$ Generation (5G) networks

Description of the Related Technology

FIG. 1 shows components of an existing $4^{th}$ Generation (4G), Long Term Evolution (LTE), network 100, which comprises a Radio Access Network (RAN) 101, a Evolved Packet Core (EPC) network 103 and a services domain 105. The RAN 101 comprises 4G-capable user equipments 111a, 111b, commonly referred to as user equipment (UE) and a base station eNodeB 113, which performs Radio Resource Management and Radio Bearer Control, essentially handling all aspects of allocation of radio resources to UEs 111a, 111b. The core network 103 comprises a Mobility Management Entity (MME) 121, which is responsible for UE authentication (by interacting with the Home Subscriber Server (HSS) 123), bearer activation and deactivation in conjunction with the eNodeB 113, and selection of the Serving Gateway (SGW) 125. The SGW 125 routes and forwards user data packets, acts as a mobility anchor, and is responsible for managing UE contexts for IP services. The Packet Data Network (PDN) Gateway (PGW) 127 performs UE IP address management and is the point of exit and entry for traffic from the core network 103 to the services domain 105 via the SGi interface. PGW 127 interacts with services such as Policy and Charging Rules Function PCRF 131 in order to ensure services are metered and charged correctly, and with components of the PDN 133, which encompasses e.g. cloud and on-premise software services. Each component in the RAN 101, Core Network 103 and Services Domain 105 has a set of rules, commonly referred to as protocols and configured as a stack, that govern how it communicates with other components. These are generally referred to as interfaces. For example, as is also shown in FIG. 1, there is an S1-MME stack that supports the so-called S1 interface between the MME 121 and the eNodeB 113 and an S11 stack that supports the so-called S11 interface between the MME 121 and the SGW 125.

FIG. 2 shows components of a 5G network 200, arranged in a reference point representation that focuses on the interactions between network functions, which is to say defined by a point-to-point reference point between any two network functions (e.g. Session Management Function SMF 225 and Policy Control Function PCF 231 via reference point N7, also referred to as an N7 interface). In FIG. 2, the RAN 201 comprises 5G-capable UEs 211a, 211b and a base station gNodeB 213, which communicates with an Access and Mobility Management Function AMF 221 in the 5G Core (5GC) network 203. The AMF 221 performs mobility management and network access, registration and security, and communicates with a Session Management Function 225, which performs UE IP address management and session management. Also shown in the core network portion 203 is User Plane Function UPF 227, which is purely a user plane component that performs 5G packet processing and transmission operations, and Policy Charging Function PCF 231. The N6 interface is equivalent to the SGi interface in EPC network 103.

A difference between the network architectures of the EPC network 103 and 5GC network 203 is the service-based architecture with a stricter split between control plane (CP) and user plane (UP) functions, referred to as Control User Plane Separation (CUPS): in EPC the SGW 125 and PGW 127 perform a mixture of CP and UP functions, whereas in 5GC there is a full CP/UP split: the AMF 221 and SMF 225 perform solely control plane functions, and the UPF 227 performs solely user plane functions. In recent years the EPC network has had an architectural enhancement to include CUPS, and whilst this has not been widely deployed, the driver for a service-based architecture is the ever increasing need to support data connectivity and services which enable deployment using new techniques such as Network Function Virtualization (NFV) and Software Defined Networking (SDN). The need for these new techniques in turn is driven by the disparate profiles of data services that need to be supported: networks are moving away from the paradigm in which the role of the core network is to support predominantly smartphones. Increasingly the range and connectivity requirements of user devices is changing. For example, mobile networks are now required to support smartphone users seeking data rates up to Gbps as well as low latency services and low speed IoT devices.

To address the need to support different types of services, discussions in the 3GPP community have led to the concept of network slicing, and the introduction of a parameter Network Slice Selection Assistance Information (S-NSSAI). A network slice is a logical end-to-end network, which is dynamically created at the point of session establishment for a particular service. S-NSSAI is defined by expected network behaviour and comprises parameters slice type SST and slice differentiator SD. There are currently 8 S-NSAAI, each of which can have standard or network-specific values. Examples of standard values, as defined in section 5.15.2 of 3GPP TS 23.501 "System Architecture for the 5G System", include enhanced Mobile Broadband (eMBB), Ultra-Reliable Low Latency Communications (URLCC) and Massive IoT (MIoT).

FIG. 3 shows that the AMF 221 serves as a control anchor for any given UE 211a for all slices that the UE 211a can access, here Slice A and Slice B. A 5G-enabled UE can access these slices A and B via two separate PDU sessions. One PDU session can only belong to one network slice, which is to say that PDU Session Context in SMF 225a, 225b, AMF 221 and RAN 201 has a one-to-one association between PDU session and S-NSSAI. Accordingly, slice information is carried and used in UE to AMF 221 PDU session requests, and it is used in the selection of SMF 225a, 225b.

Operators are currently seeking to upgrade existing 4G network components to 5G network components. However, 5G radio access nodes are not yet available, and in the interim 4G capacity upgrades will be needed. 3GPP has proposed an architecture for interworking between the two networks, that allows for 5G user plane capacity to be added to an existing network. This is set out in section 4.3 of the afore-mentioned 3GPP TS 23.501. This architecture is shown in FIG. 4, from which it can be seen that existing 4G EPC nodes, in particular PGW 127 is proposed to be split, logically, between CP and UP functions, and supplemented by processing of the SMF 225 and UPF 227 respectively. A problem with this is that it requires adaptation to several 4G EPC nodes, which is time consuming and costly, and is likely to retard the rate at which new services, such as will be enabled by network slicing, can be introduced. Furthermore, it runs the risk of disrupting existing (shortly to become legacy) 4G services.

There is a need to provide an improved architecture that allows for new core network components, and associated services, to be added to an existing network efficiently.

SUMMARY

According to an aspect of the present disclosure, there is provided a method of establishing a PDU session in a data communications network. A create session request is received. A create session management context request is generated and transmitted to a Session Management Function (SMF). A create session management context request response is received from the SMF. A create session request response is generated and sent, thereby allowing a PDU session to be established in a 5G Core network by a legacy Mobile Management Entity (MME), for example, where the create session request is received from the MME and the create session request response is sent to the MME.

According to an aspect of the present disclosure, there is provided a method of controlling a PDU session in a data communications network. A Policy Control Function (PCF) request is received from an SMF. A Policy and Charging Rules Function (PCRF) request is generated based on the received PCF request and transmitted to the PCRF. A PCRF request response is received from the PCRF. A Policy Control Function PCF request response is generated based on the PCRF request response and transmitted to the SMF.

According to an aspect of the present disclosure, there is provided a method of transmitting packets in a PDU session in a data communications network. A PDU session for a user equipment is set up using an SMF. A plurality of packet data flows are received from a Packet Data Network (PDN), each relating to the PDU session. The plurality of packet data flows are encapsulated into a corresponding plurality of GTP-U tunnels, each relating to a different bearer for the user equipment and transmitted to a base station serving the user equipment.

Further features and aspects of the disclosure will become apparent from the following description of preferred examples of the invention, given by way of example only, which is made with reference to the accompanying drawings.

DETAILED DESCRIPTION OF CERTAIN INVENTIVE EMBODIMENTS

Examples of the disclosure made herein concern a system for and method of establishing a PDU session in a data communications network, in which User Equipments (UEs) 111 attached to a 4G Evolved UMTS Terrestrial Radio Access Network (EUTRAN) can make use of services of the 5GC network 200. In this system and method, one or more interworking functions (IWFs), namely functional nodes conducting protocol conversion and/or other functions for interworking between elements of the 4G network and elements of the 5G network, may be provided. An IWF is represented here as being located in the new 5GC network to illustrate that the node is not part of the legacy EPC network, but it should be understood that an IWF is located between the respective network parts.

Figure 1:
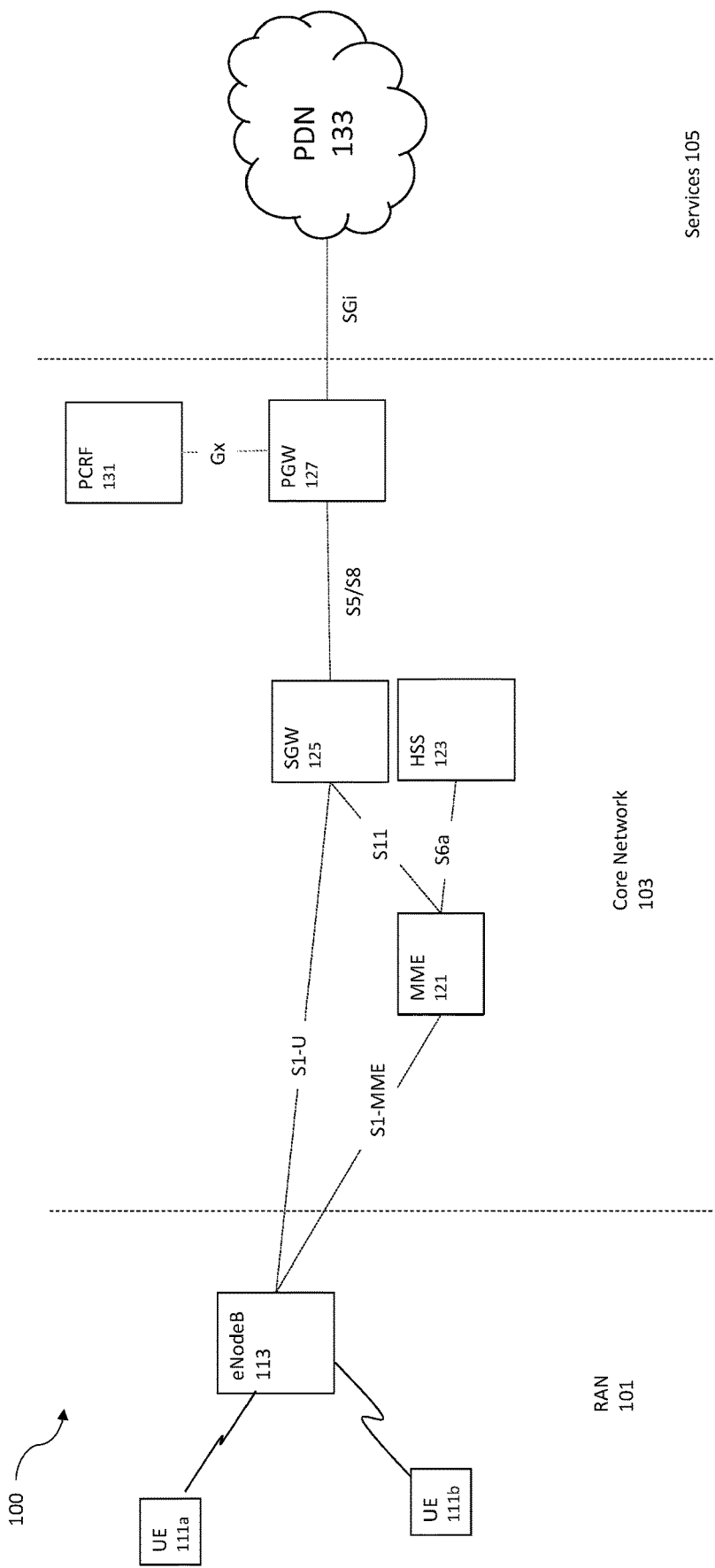
FIG. 1 is a schematic diagram showing components of a 4G Evolved Packet Core (EPC) network.
Figure 2:
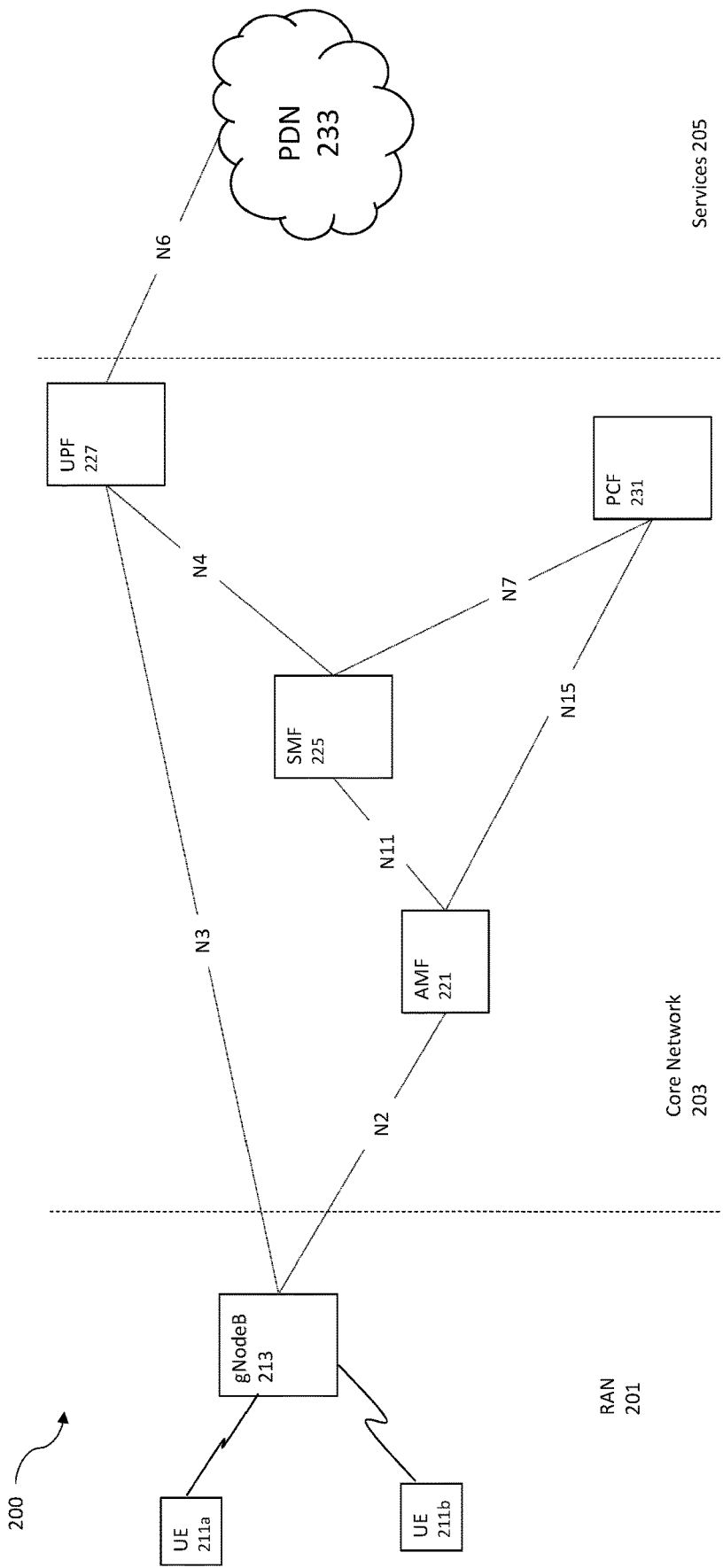
FIG. 2 is a schematic diagram showing components of a 5GC network.
Figure 3:
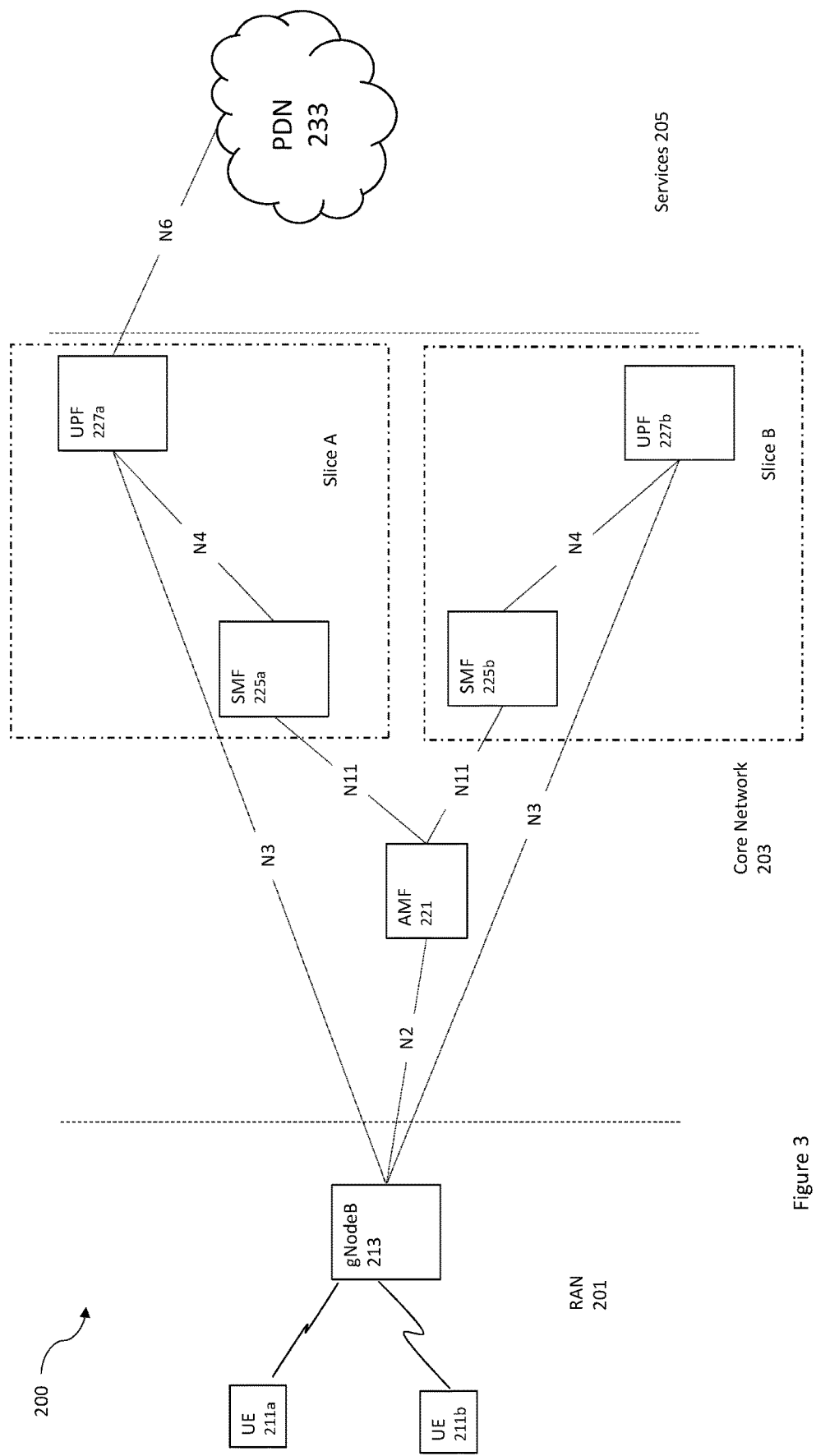
FIG. 3 is a schematic diagram, depicting network slicing within a 5GC network of FIG. 2.
Figure 4:
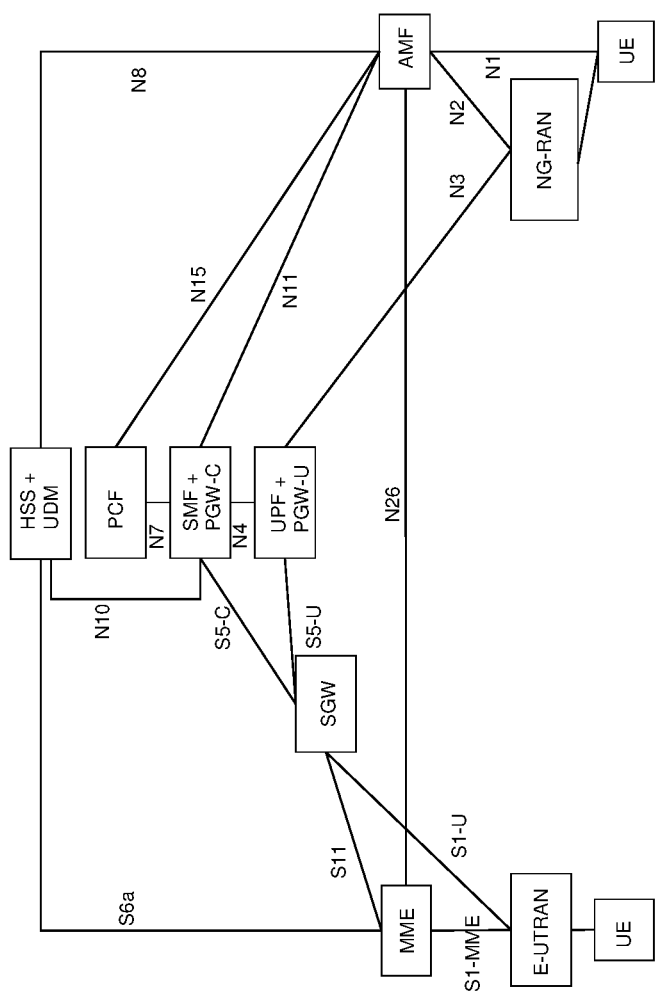
FIG. 4 is a schematic diagram showing a conventional architecture for supporting 4G and 5G services.
Figure 5:
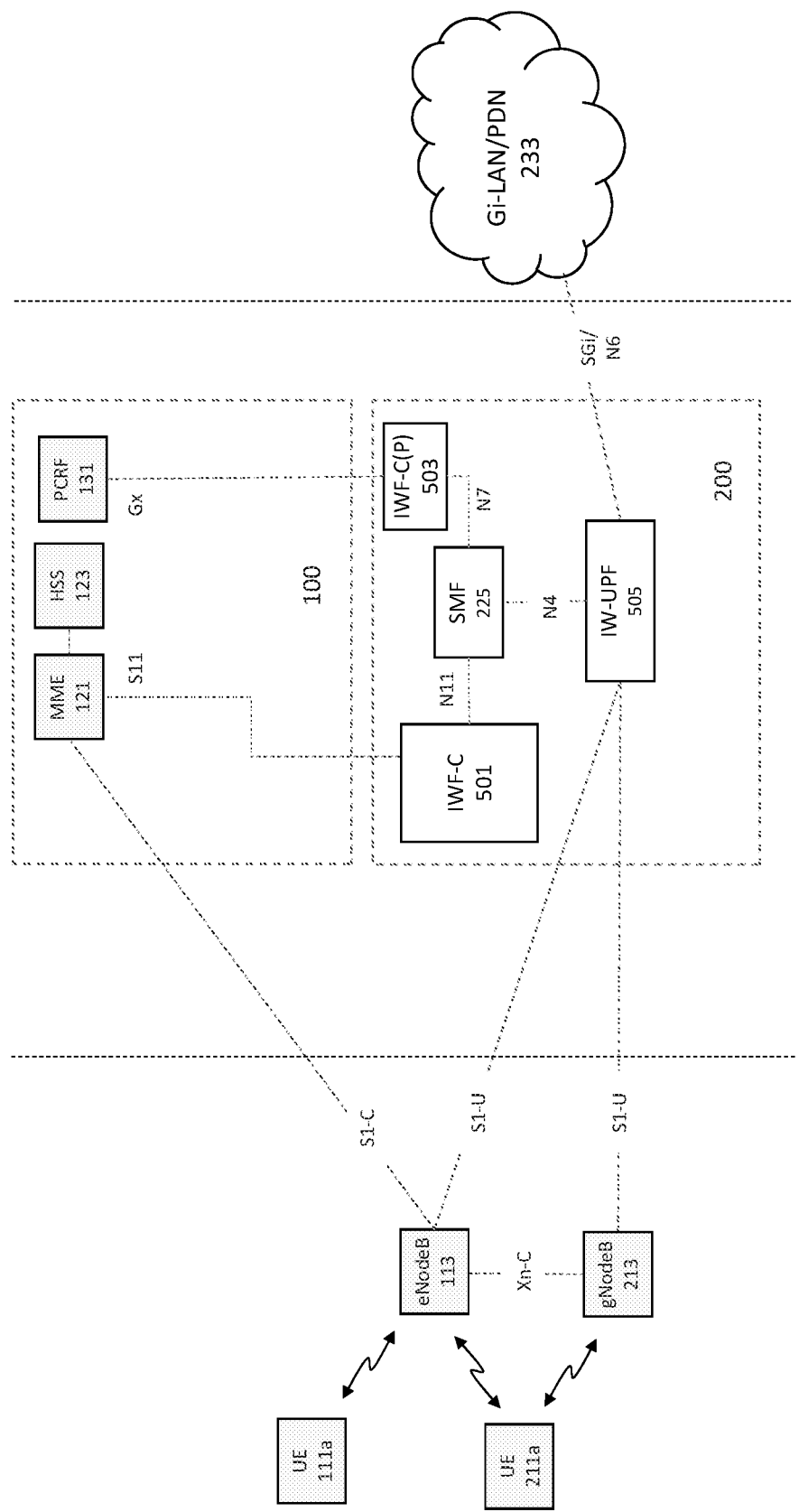
FIG. 5 is a schematic diagram showing an architecture according to an example of the current disclosure.

Referring to FIG. 5, the 5GC network 200 may include a control plane interworking function IWF-C 501, which represents itself to an MME 121 of the EPC network 100 as a Serving Gateway (SGW) over an S11 interface and to an SMF 225 of the 5GC network 200 as an Access and Mobility Management Function (AMF) over an N11 interface. An exemplary user equipment, UE 111a, is a 4G UE which is not 5G capable. The IWF-C 501 enables the MME 121 to handle registration of a UE 111a attached to the 4G eNodeB 113, and thereafter make use of 5GC network services via the SMF 225 and other 5G core network functions. Note that, as shown, the IWF-C 501 has the functionality of an AMF of the 5GC network 200, but it could alternatively be implemented as a standalone function independent of any 5GC components, with a connection to an AMF 221. The MME 121 may make use of the existing S11 interface to communicate with IWF-C 501.

The 5GC network 200 may include a control plane policy interworking function IWF-C(P) 503, which represents itself to the SMF 225 as a PCF component over an N7 interface and represents itself to the PCRF 131 as a Policy and Charging Enforcement Function (PCEF) over a Gx interface. This enables 5G components to access the 4G PCRF component 131, which allows, for example, for policy management and charging in the case of a 4G UE 111a attached to a 4G eNodeB 113.

The 5GC network 200 may include an interworking User Plane Function IW-UPF 505 which performs the standard functions of a 5G UPF, with the additional capability to set up, and encapsulate/decapsulate data to/from, multiple GTP-U tunnels over the S1-U interface, for a single PDU session on the SGi/N6 interface, as will be described in further detail below. The IW-UPF 505 may be instantiated as a UPF with additional procedures for GTP-U tunnel set up and encapsulation/decapsulation for S1-U operation.

Establishment of a PDU session utilizing the components shown in FIG. 5 will now be described, with reference to FIG. 6, which describes a default bearer creation procedure. At step S601 the UE 111$a$, via eNodeB 113, sends an Initial Non-Access Stratum (NAS) Request message to the MME 121, which, in accordance with the 4G standards, is forwarded to the HSS at step S603 in an Authentication Request message. The HSS responds with Authentication Request Response message at step S605, which, for the purposes of this example enables the MME 121 to return an authorization response message at step S607 to the UE 111$a$. In addition, the MME 121 sends a create session request, in the form of a Create Session Request message, at step S609 over the S11 interface to the IWF-C 501. This message includes details of the relevant Tunnel Endpoint Identifier (TEID), in accordance with the requirements of GTP-C over UDP. Further details of the Create Session Request message, and its accompanying Create Session Response message, are defined in 3GPP TS 29.274 "Evolved Packet System (EPS); Evolved General Packet Radio Service (GPRS) Tunnelling Protocol for Control plane (GTPv2-C)", the contents of which are incorporated by reference.

Responsive to receipt of the Create Session Request message at step S609, the IWF-C 501 utilizes the Nsmf interface defined in 3GPP TS 29.502 "5G System; Session Management Services", the contents of which are incorporated herein by reference. The IWF-C 501 formulates a create session management context request, in the form of a Nsmf_PDUSession_CreateSMContext Request message, at step S611 and sends that to the SMF 225 over interface N11. In order to formulate this Nsmf_PDUSession_CreateSMContext Request message the IWF-C 501 translates between parameters present in the Create Session Request message received over the S11 interface, and parameters required in a create session management context request message that is to be sent to the SMF 225 over the N11 interface. An example translation between selected parameters is shown in Table 1 below:

| S11 Parameter | N11 Parameter |
| --- | --- |
| International Mobile Subscriber Identity (IMSI) | Subscriber Permanent Identifier (SUPI) |
| Access Point Name (APN) | Data Network Name (DNN) |
| Radio Access Technology (RAT) Type [EUTRAN] | Access Type |
| Tracking Area Identity (TAI) [MCC, MNC, TAC] | User Location Information |

In addition to translating certain parameters present in the Create Session Request message received over the S11 interface at step S609, the IWF-C 501 is configured to determine values for certain parameters in the generated Nsmf_PDUSession_CreateSMContext Request message that are not equivalent to parameters of the Create Session Request message received over the S11 interface. In step S611, particular parameters for which contents may be generated or allocated by the IWF-C 501 for subsequent use and mapping include the following N11 parameters:

Request Type;
PCF ID;
S-NSSAI;
PDU Session ID; and/or

AMF ID parameter, also referred to as a Globally Unique AMF ID (GUAMI).

The Request Type parameter in the Nsmf_PDUSession_CreateSMContext message may be set according to the received S11 message type, namely the Create Session Request message type.

The PCF ID parameter may be set to a value allocated by the IWF-C 501, which may comprise an identity or network address of the IWF-C(P) 503.

The IWF-C 501 may be configured with network slice selection capability. The S-NSSAI parameter may be set to a value allocated by the IWF-C 501. The S-NSSAI is a network slice identifier which may be allocated at least in part on the basis of a subscriber identify, for example a International Mobile Subscriber Identity (IMSI), included in the S11 Create Session Request message. The S-NSSAI may be allocated at least in part on the basis of a tracking area identifier, such as a Tracking Area Identity (TAI), included in the S11 Create Session Request message. The S-NSSAI may also be allocated at least in part based on policy data configured to control selection of a network slice. The policy data may be stored in the IWF-C 501 and/or may be derived from a different node in the 5G control plane, for example a Network Slice Selection Function (NSSF).

The PDU Session ID parameter may be set to a value allocated by the IWF-C 501, which may be based at least in part on a bearer identifier, for example an Evolved Packet System (EPS) Bearer ID, included as part of the Sender Fully Qualified Tunnel Endpoint Identifier (F-TEID) for Control Plane parameter, in the S11 Create Session Request message.

Aspects of the session management procedures of the SMF and related to policies are defined in 3GPP TS 23.501 "System Architecture for the 5G System", 3GPP TS 23.502 "Procedures for the 5G System", and 3GPP TS 23.503 "Policy and Charging Control Framework for the 5G System", the contents of each of which are incorporated herein by reference.

In response to receipt of the Nsmf_PDUSession_CreateSMContext Request message, the SMF 225 creates a Policy Control Function (PCF) request message, in the form of an SMPolicyControl_Create message containing smPolicyContextData. This message is transmitted at step S613 over interface N7 to the IWF-C(P) 503, which, as noted above, represents itself to the SMF 225 as a 5G PCF component. Further details of the PCF request message, and its accompanying PCF response message, received over the N7 interface from the IWF-C(P) 503, are defined in 3GPP TS 29.512 "5G System; Session Management Policy Control Service; Stage 3", the contents of which are incorporated by reference.

The SMF 225 uses the PCF ID information generated by IWF-C 501 as described above in order to direct the PCF request message to the IWF-C(P) 503, instead of a PCF.

The IWF-C(P) 503 transforms the PCF request message into a PCRF message and then utilizes the Gx interface to send the PCRF request message to the PCRF 131 at step S615, and its PCRF response is transmitted back to the IWF-C(P) 503 at step S617. Further details of the Gx interface and PCRF messaging procedures are defined in 3GPP TS 29.212 "Policy and Charging Control (PCC); Reference points", the contents of which are incorporated by reference.

The IWF-C(P) 503 transforms the PCRF response message into a PCF response message and again makes use of the N7 interface to send the PCF response to SMF 225 at step S619. Thereafter the SMF 225 sends a session establishment request over interface N4 to the IW-UPF 505 at step S621, and responsive to an API Response "200 OK" message at step S623, sends a create session management context request response, in the form of a Nsmf_PDUSession_CreateSMContext Response message, to the IWF-C 501 (step S625) over interface N11. Once the IWF-C 501 has received and processed this from the SMF 225, the IWF-C 501 formulates a create session request response, in the form of Create Session Response message, at step S627 and sends that over interface S11 to the MME 121. The MME 121 then completes the last step on the part of core network components to establish a PDU session by sending an attach accept request to the eNodeB 113.

As mentioned above, the IWF-C 501 may be configured with network slice selection capability, enabling this MME-originating PDU session to make use of the afore-mentioned network slicing features. Accordingly, as part of sending the Nsmf_PDUSession_CreateSMContext Request message to the SMF 225 at step S611, the IWF-C 501 can determine a network slice, select an SMF e.g. SMF 225a from a plurality of Session Management Functions SMFs 225a, 225b based on the determined network slice, and transmit the create session management context request to the selected Session Management Function SMF 225a. Determination of the network slice can be performed based upon a subscriber identifier, which is included in the message sent to the IWF-C 501 by the MME 121 at step S609. Further, the network slice can be determined based upon a tracking area identifier, which is also provided by the MME 121 and contained within the Create Session Request message sent at step S609. Optionally the network slice may be selected based upon policy data relating to data rates and/or activity factors, configured to the IWF-C 501 for the various S-NSSAI information types, e.g. as set forth in 3GPP TS 22.261 "Service Requirements for Next Generation New Services and Markets".

Returning to FIG. 6, having received an attach accept message sent at step S629, the UE 111a and eNodeB 113 exchange further messages (not shown) for bearer establishment, which causes the eNodeB 113 to send a UE capability indication message to the MME 121 at step S631. In response, and in accordance with known procedures, this causes the MME 121 to send a modify bearer request message over the S11 interface, at step S633, to the IWF-C 501. In response, the IWF-C 501 generates an update session management context request and transmits that to the SMF 225 (which may be SMF 225a selected based upon network slice, as described above) at step S635 over the N11 interface. Thereafter the message flow proceeds between the SMF 225 and IW-UPF 505 in accordance with standard 5GC network message protocols (steps S637, S639), and the SMF 225 sends an update session management context request response to the IWF-C 501 at step S641. The content of the update session management context request response is determined and the IWF-C 501 generates a modify bearer response message, which is transmitted to the MME 121 at step S643. A PDU session may then be conducted in the user plane between the UE 111a and the Gi-LAN/PDN 233 via the IW-UPF 505 and S1-U interface.

Figure 7:
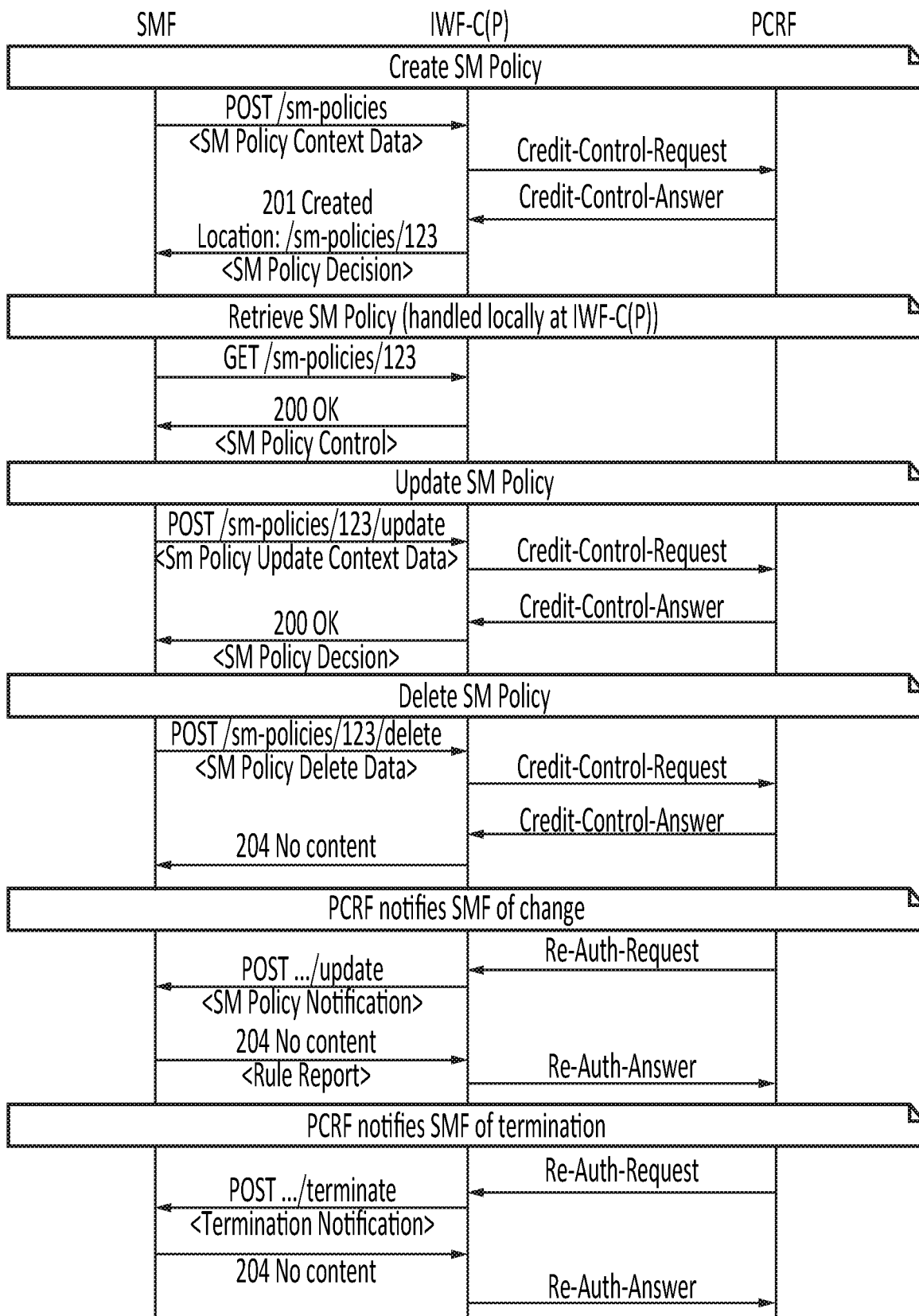
FIG. 7 shows a series of sequence diagrams showing steps associated with various policy management procedures.

FIG. 7 shows a series of sequence diagrams showing steps associated with various policy management procedures carried out by the IWF-C(P) 503, including the creation of an SM policy by an SMF 225, the retrieval of an SM policy by an SMF 225, the updating of an SM policy by an SMF 225, and the deletion of an SM policy by an SMF 225. Each of these different procedures are initiated by the SMF 225 sending HTTP POST messages which are translated by the IWF-C(P) 503 into respective Credit Control-Request messages and sent to the PCRF 131 with the exception of the retrieval of an SM policy, which may be handled locally at the IWF-C(P) 503, which may revert directly with a corresponding SM Policy Control response. When Credit Control-Request messages are sent by the IWF-C(P) to the PCRF 131, the associated Credit Control-Answer messages, when received, are translated into 2xx response messages by the IWF-C(P) 503 and sent to the SMF 225.

Further policy management procedures carried out by the IWF-C(P) 503 in the other direction include the PCRF 131 notifying of a PDU session change, and the PCRF 131 notifying of a PDU session termination, each done by the PCRF 131 sending appropriately formatted Re-Auth-Requests to the IWF-C(P) 503. The IWF-C(P) generates corresponding different HTTP POST messages and sends these to the SMF 225. The associated 2xx response messages are received from the SMF 225, which are translated by the IWF-C(P) 503 into corresponding Re-Auth-Answer messages and sent to the PCRF 131.

In the procedures illustrated in FIG. 7, a Diameter session identifier may be used in the messages sent between the IWF-C(P) 503 and the PCRF 131. The Diameter session identifier may be generated by the IWF-C(P) 503 when first establishing policy for a new PDU session, and may be re-used as the PDU session identifier on the N7 interface.

In addition to default bearers establishment by the MME 121, in 4G networks additional dedicated bearers can be created by the Serving Gateway (SGW) component). These are used to separate traffic requiring different Quality of Service (QoS). In 5G networks, the equivalent procedures do not trigger new bearer creation; they trigger a modification of an existing PDU session. The IWF-C 501 may be arranged to interwork between SMF procedures for changing QoS and MME procedures which create a new dedicated bearer.

When the IWF-C(P) 503 receives policy from the PCRF 131, it determines whether (and how many) additional bearers it needs to allocate. A single PDU session on the 5G N4 interface between the SMF 225 and IW-UPF 505 can comprise multiple GTP tunnels, and this is used by the SMF 225 to program the different "bearers", when handling sessions for a 4G-attached UE 111a. The SMF 225 performs this function, either dynamically as a result of programming by the IWF-C(P) 503 or through configuration.

As described above, the IW-UPF 505 performs the standard functions of a 5G UPF, with the additional capability to set up, and encapsulate/decapsulate data to/from, multiple GTP-U tunnels over the S1-U interface, for a single PDU session set up by the SMF 225, for data received on, and transmitted via, the SGi/N6 interface. The LTE S1-U interface is GTPv1-U; which is similar on the wire to the equivalent 5G interface, N3. Both are formatted according to 3GPP TS 29.281. The only difference is that the N3 interface uses a GTP extension header (defined by TS 38.415) to carry QoS information, while S1-U does not support this. This is because the EPC takes a different approach to QoS—where 5G multiplexes multiple QoS types over the same GTP tunnel, LTE establishes separate GTP tunnels for each QoS type. The IW-UPF 505 accordingly establishes separate GTP-U tunnels over the S1-U interface, for a single PDU session set up for the user equipment by the SMF 225.

Figure 8:
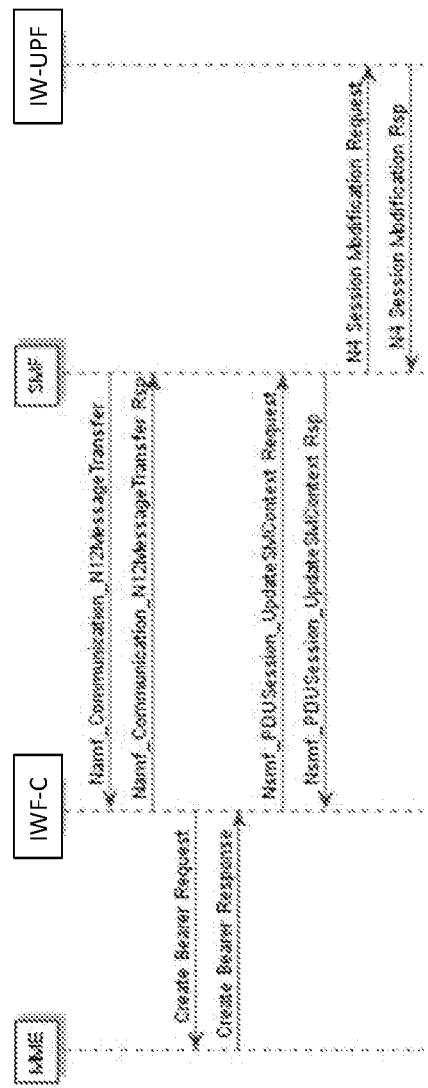
FIG. 8 is a sequence diagram showing steps associated with changing a Quality of Service associated with a PDU session in a data communications network according to an example of the present disclosure.

As illustrated in FIG. 8, the SMF 225 may initiate a change in QoS with the transmission of a Namf_Communication_N12MessageTransfer message to the IWF-C 501, which the IWF-C 501 converts into a Create Bearer Request and which it transmits to the MME 121. In order to formulate this message, the IWF-C 501 performs a translation between the contents of the Namf messages sent over the N11 interface and the contents of the Create Bearer Request sent over the S11 interface, using an inverse of the processing when creating a Default Bearer in the opposite direction (as described above).

The MME 121 communicates with the eNodeB 113 according to standard 4G procedures and then returns a Create Bearer Response containing new Tunnel Endpoint Information (TEID) for the 4G RAN in accordance with the procedures for GTP-U. The IWF-C 501 translates this back into an Nsmf_PDUSession_UpdateSMContext Request which is passed to the SMF 225. The SMF 225 finally performs an update in the IW-UPF 505 to update the Tunnel Endpoint ID for S1-U traffic for this bearer, using the standard N4 interface.

In the above, the UE 111*a* is a 4G UE which is not 5G capable. A UE 211*a* which is both 4G and 5G capable, referred to as a Non-Standalone (NSA) UE, may be used in a similar manner to that described above, for communications via the eNodeB 113. The NSA UE 211*a* may also initiate a call via a 5G radio node, gNodeB 213, once such nodes are provided in the network. In this way the 5G radio capacity may be gradually increased by rolling out 5G radio nodes whilst maintaining the existing 4G EPC network, and user plane capacity may be added in the 5GC network.

Figure 6:
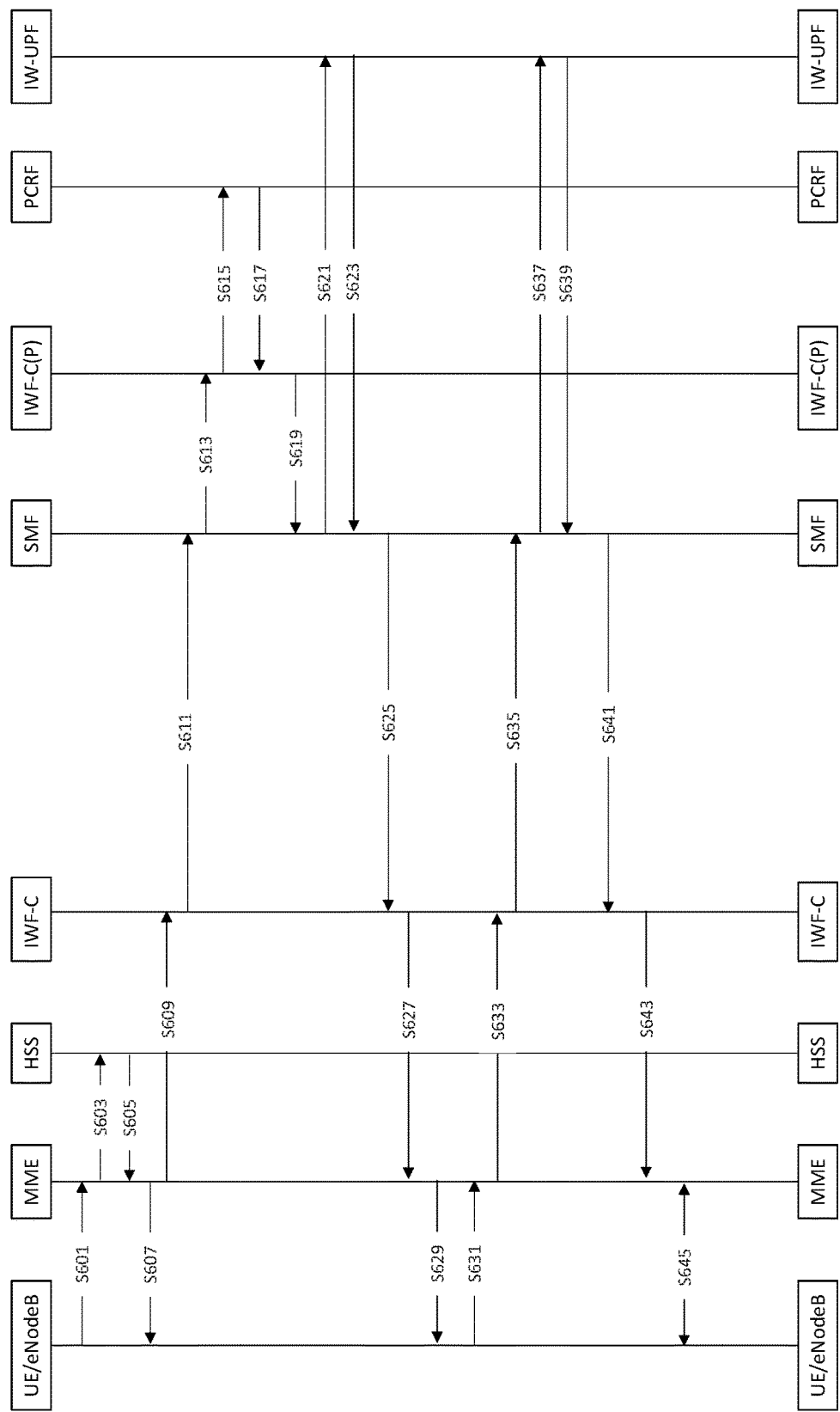
FIG. 6 is a sequence diagram showing steps associated with establishing a PDU session in a data communications network according to an example of the present disclosure.

An advantage of the architecture set forth in FIG. 5, and for which PDU session establishment is exemplified in FIG. 6, is that changes to existing 4G EPC network components and future 5GC network components is minimised. In this way an existing EPC can continue operating alongside newly deployed 5GC, and make use of functionality such as network slicing, without having to be upgraded or reconfigured.

Figure 9:
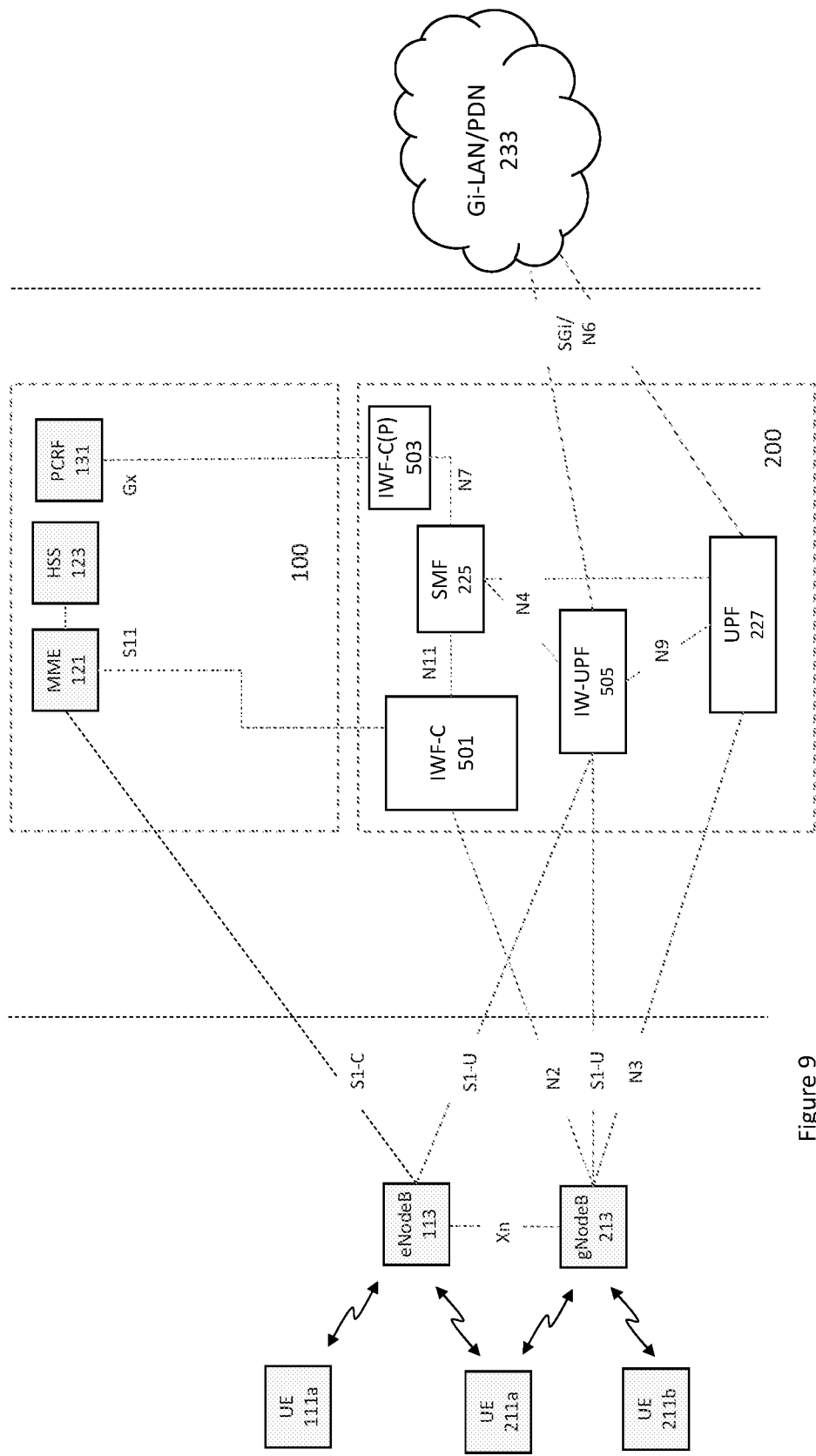
FIG. 9 is a schematic diagram showing an architecture according to an example of the current disclosure.

In a further example, shown in FIG. 9, the network arrangement of FIG. 5 is modified to handle the establishment of standard 5G data flows between user equipment and a standard UPF 227. The network arrangement may include an N2 Interface between the gNode B 213 and an AMF, which may be implemented in the IWF-C 501 as shown in FIG. 9, or as a standard 5G AMF. The network arrangement may include an N3 Interface between the gNode B 213 and a UPF, which may be implemented in the IW-UPF 505 and/or as a standard 5G UPF 227, as shown in FIG. 9. In this example, the IW-UPF 505 may perform an interworking function without performing all functions of a UPF, and represent itself as a Serving Gateway (SGW) to an eNodeB 113 and/or a gNodeB 213 over an S1-U interface and may represent itself as a gNode B to a UPF 227 over an N3 interface. Alternatively, the IW-UPF 505 may process packets in series with a standard 5G UPF 227 over a N9 interface, as shown in FIG. 9.

In the example shown, the IWF-C 501 incorporates AMF functionality, and gNode B 213 may route control plane data to the IWF-C 501 over the N2 interface and user plane data to the UPF 227 over the N3 interface, according to standard 5G data communications including 5G bearer creation procedures. Where an AMF is implemented separately from the IWF-C 501, the N2 interface may be terminated at a standard 5G AMF (not shown), and gNode B 213 may route control plane data to the AMF over the N2 interface and user plane data to the UPF 227 over the N3 interface, according to standard 5G data communications including 5G bearer creation procedures.

In any case, in the arrangement of FIG. 9, a 5G UE which is not 4G capable, referred to as a Standalone (SA) UE 211*b*, may be used in the manner described using standard 5G data communications including 5G bearer creation procedures. The NSA UE 211*a* may also be used in the manner described using standard 5G data communications including 5G bearer creation procedures.

In the example shown in FIG. 9, there is no need for any significant upgrade of the 5GC components already installed for use with 4G UEs and NSA UEs, such as in the arrangement shown in FIG. 5. A 5G-capable UE 211*a*, 211*b*, may be used to initiate a 5G call via a 5G radio node, gNodeB 213, without the need for any significant upgrade of the 5GC components already installed for use with 4G UEs and NSA UEs, such as in the arrangement shown in FIG. 5.

Figure 10:
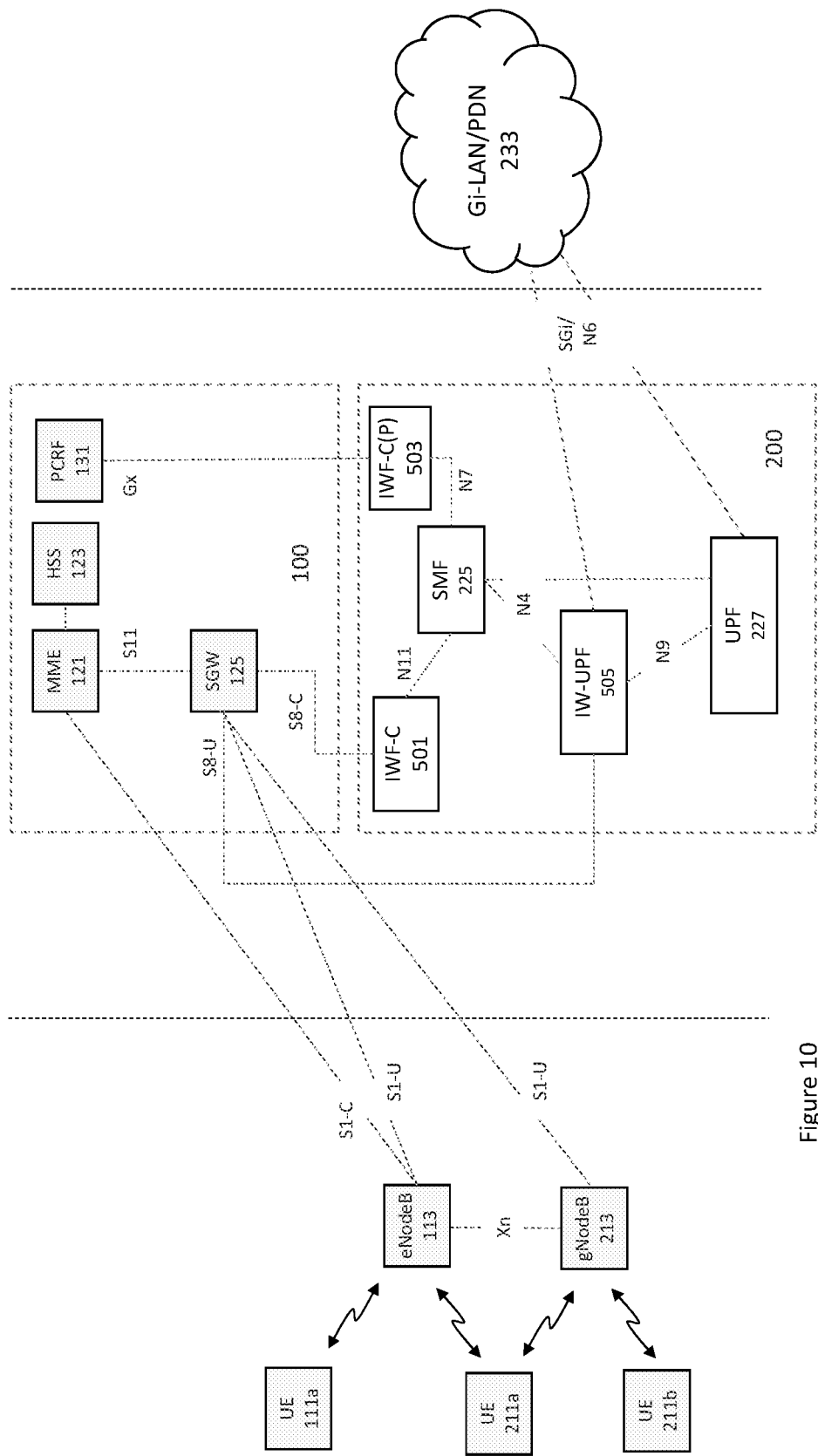
FIG. 10 is a schematic diagram showing an architecture according to an example of the current disclosure.

In the examples shown in FIGS. 5 and 9, the IWF-C 501 supports the S11 interface and is arranged between the MME 121 and the SMF 225. However, in a further example network arrangement, shown in FIG. 10, the IWF-C 501 is arranged in a different location, namely between the SGW 125 and the SMF 225. This may enable a fully 5G network belonging to one entity to interface with a remote 4G network belonging to a separate entity, where the entity having control of the fully 5G network does not have control of the various devices in the remote 4G network.

In particular, whereas in FIGS. 5 and 9 the 4G network 100 does not comprise an SGW 125 and the IWF-C 501 represents itself to the MME 121 as an SGW 125 over an S11 interface, in this example the 4G network 100 comprises an SGW 125 having an S11 interface with the MME 121, and the IWF-C 501 represents itself to the SGW 125 as a PGW 127 over an S8 interface. In particular, the IWF-C 501 is inserted between the SGW 125 in the remote 4G network 100 and the SMF 225 in the proximate 5G network 200 and presents itself as a PGW 127 for the SGW 125 to communicate with. As such, in this example, instead of the IWF-C 501 communicating with the MME 121 over the S11 interface, the IWF-C 501 communicates with the SGW 125 over the S8 interface and the SGW 125 communicates with the MME 121 over the S11 interface. The IWF-C 501, in effect, receives similar information from the SGW 125 in the FIG. 10 example to the information the IWF-C 501 receives from the MME 121 in the FIG. 5 and FIG. 9 examples.

In this example, the IW-UPF 505 and UPF 227 are shown as separate devices, and there is an S8-U interface between the SGW 125 and the IW-UPF 505, and an N9 interface between the IW-UPF 505 and the UPF 227. However, as explained above, in some examples, the functionality of the IW-UPF 505 is built into the UPF 227. In particular, the S8-U (4G) interface is very similar to the N9 (5G) interface and a standard UPF 227 may already be able to support the functionality of the IW-UPF 505.

The SMF 225 can be shared between the IWF-C 501 and an AMF (not shown). In other words, both 4G and 5G UEs can use the same SMF 225 and UPF 227, Establishment of a PDU session utilizing the components shown in FIG. 10 will now be described, with reference to FIG. 11, which describes a default bearer creation procedure. Many of the steps of FIG. 11 correspond to those in FIG. 6, as indicated by use of the same reference sign but incremented by 500.

Figure 11:
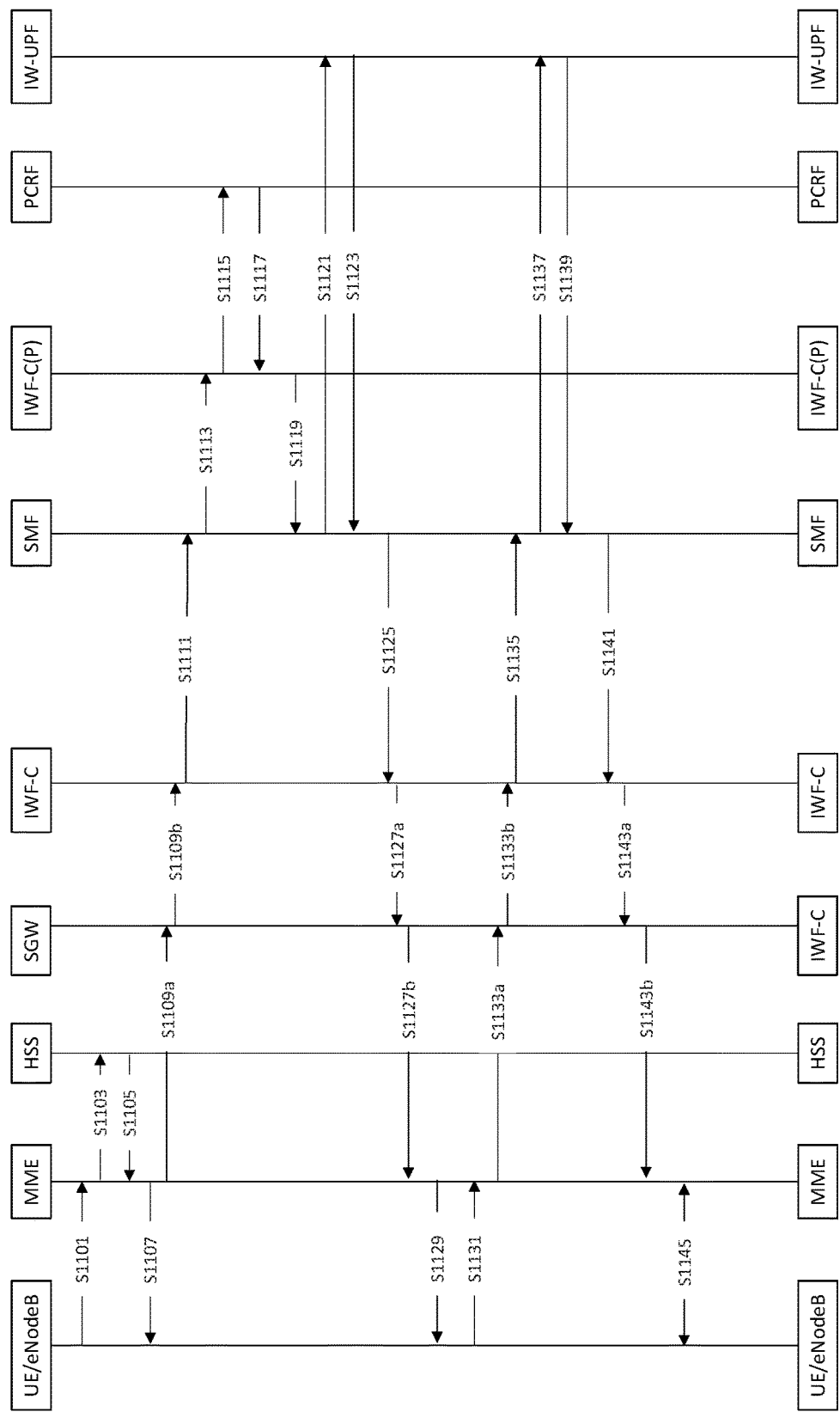
FIG. 11 is a sequence diagram showing steps associated with establishing a PDU session in a data communications network according to an example of the present disclosure.

However, whereas in FIG. 6 the MME 121 sends a create session request, in the form of a Create Session Request message, at step S609 over the S11 interface to the IWF-C 501, in FIG. 11 the MME 121 sends the Create Session Request message at step S1109*a* over the S11 interface to the SGW 125 and the SGW 125 sends the Create Session Request message at step S1109*b* over the S8 interface to the IWF-C 501. Similarly, whereas in FIG. 6 the IWF-C 501 sends a create session request response, in the form of Create Session Response message, at step S627 over the S11 interface to the MME 121, in FIG. 11 the IWF-C 501 sends the Create Session Response message at step S1127a over the S8 interface to the SGW 125 and the SGW 125 sends the Create Session Response message at step S1127b over the S11 interface to the MME 121.

In addition, whereas in FIG. 6 the MME 121 sends a modify bearer request message at step S633 over the S11 interface to the IWF-C 501, in FIG. 11 the MME 121 sends the modify bearer request message at step S1133a over the S11 interface to the SGW 125 and the SGW 125 sends the modify bearer request message at step S1133b over the S8 interface to the IWF-C 501. Similarly, whereas in FIG. 11 the IWF-C 501 sends a modify bearer response message at step S643 over the S11 interface to the MME 121, in FIG. 11 the IWF-C 501 sends the modify bearer response message at step S1143a over the S8 interface to the SGW 125 and the SGW sends the modify bearer response message at step S1143b over the S11 interface to the MME 121.

Non-Limiting Additional Implementation Details

In some examples the IWF-C 501, IWF-C(P) 503 and IW-UPF 505 are embodied as software configured to execute on and utilize standard computer processing resources, to perform the functions described above. Implementations of the IWF-C 501 and IWF-C(P) 503 may be separated or combined.

Whilst in the above, the IWF-C 501 performs the function of a SGW with respect to the MME 121, in the alternative or in addition the IWF-C 501 may perform the functions of a combined SGW and PGW, referred to as a Service Architecture Evolution (SAE-GW) with respect to the MME 121.

Although at least some aspects of the examples described herein with reference to the drawings comprise computer processes e.g. in the form of processing systems, agents or processors, the examples also extend to computer programs, particularly computer programs on or in a carrier, adapted for putting the invention into practice. The program may be in the form of non-transitory source code, object code, a code intermediate source and object code such as in partially compiled form, or in any other non-transitory form suitable for use in the implementation of processes according to the invention. The carrier may be any entity or device capable of carrying the program. For example, the carrier may comprise a storage medium, such as a solid-state drive (SSD) or other semiconductor-based RAM; a ROM, for example a CD ROM or a semiconductor ROM; a magnetic recording medium, for example a hard disk; optical memory devices in general; etc.

It will be understood that the processor or processing system or circuitry referred to herein may in practice be provided by a single chip or integrated circuit or plural chips or integrated circuits, optionally provided as a chipset, an application-specific integrated circuit (ASIC), parameter-programmable gate array (FPGA), digital signal processor (DSP), etc. The chip or chips may comprise circuitry (as well as possibly firmware) for embodying at least one or more of a data processor or processors, a digital signal processor or processors, baseband circuitry and radio frequency circuitry, which are configurable so as to operate in accordance with the exemplary examples. In this regard, the exemplary examples may be implemented at least in part by computer software stored in (non-transitory) memory and executable by the processor, or by hardware, or by a combination of tangibly stored software and hardware (and tangibly stored firmware).

A method of establishing a Packet Data Unit (PDU) session in a data communications network is provided, comprising: receiving a create session request from a Mobile Management Entity (MME); generating a create session management context request; transmitting the generated create session management context request to a Session Management Function (SMF); receiving a create session management context request response from the SMF; generating a create session request response; and transmitting the create session request response to the MME.

In some examples, transmitting the generated create session management context request comprises determining a network slice, selecting an SMF from a plurality of SMFs based on the determined network slice, and transmitting the create session management context request to the selected SMF.

In some examples, the network slice is determined at least in part on the basis of a subscriber identifier contained within the create session request.

In some examples, said subscriber identifier comprises an International Mobile Subscriber Identity (IMSI).

In some examples, the network slice is determined at least in part on the basis of a tracking area identifier contained within the create session request.

In some examples, the network slice is determined at least in part based on policy data configured to control selection of a network slice.

Some examples comprise allocating a network slice identifier based on the determined network slice, and inserting the allocated network slice identifier into the create session management context request.

In some examples, the network slice identifier comprises Single Network Slice Selection Assistance Information (S-NSSAI).

Some examples comprise: receiving a Policy Control Function (PCF) request from the SMF; generating a Policy and Charging Rules Function (PCRF) request based on the received PCF request; transmitting the generated PCRF request to a PCRF; receiving a PCRF request response from the PCRF; generating a PCF request response; and transmitting the PCF request response to the SMF.

Some examples comprise: receiving a modify bearer request from the MME; generating an update session management context request; transmitting the generated update session management context request to the SMF; receiving an update session management context request response from the SMF; generating a modify bearer request response; and transmitting the modify bearer request response to the MME.

A method of modifying a Packet Data Unit (PDU) session in a data communications network is provided, comprising: receiving a modify bearer request from a Mobile Management Entity (MME); generating an update session management context request; transmitting the generated update session management context request to a Session Management Function (SMF); receiving an update session management context request response from the SMF; generating a modify bearer request response; and transmitting the modify bearer request response to the MME.

Also provided is a data communications apparatus comprising an interworking function arranged to: receive a create session request from a Mobile Management Entity (MME); generate a create session management context request; transmit the generated create session management context request to a Session Management Function (SMF); receive a create session management context request response from the SMF; generate a create session request response; and transmit the create session request response to the MME.

Also provided is a non-transitory computer readable medium containing computer-readable instructions for causing a processor to perform the method of: receiving a create session request from a Mobile Management Entity (MME); generating a create session management context request; transmitting the generated create session management context request to a Session Management Function (SMF); receiving a create session management context request response from the SMF; generating a create session request response; and transmitting the create session request response to the MME.

A method of controlling a Packet Data Unit (PDU) session in a data communications network is provided, comprising: receiving a Policy Control Function (PCF) request from a Session Management Function (SMF); generating a Policy and Charging Rules Function (PCRF) request based on the received Policy Control Function PCF request; transmitting the generated PCRF request to a PCRF; receiving a PCRF request response from the PCRF; generating a PCF request response; and transmitting the PCF request response to the SMF.

A method of transmitting packets in a Packet Data Unit (PDU) session in a data communications network is provided, comprising: setting up a PDU session for a user equipment using a Session Management Function (SMF); receiving plurality of packet data flows from a Packet Data Network (PDN), each relating to the PDU session; encapsulating the plurality of packet data flows into a corresponding plurality of GTP-U tunnels, each relating to a different bearer for the user equipment; and transmitting the packet data to a base station serving said user equipment.

In some examples, each said different bearer relates to a different Quality of Service.

In some examples, the packet data is transmitted to the base station using an S1-U interface.

The above examples are to be understood as illustrative examples. Further examples of the invention are envisaged. It is to be understood that any feature described in relation to any one example may be used alone, or in combination with other features described, and may also be used in combination with one or more features of any other of the examples, or any combination of any other of the examples. Furthermore, equivalents and modifications not described above may also be employed without departing from the scope of the present disclosure, which is defined in the accompanying claims.

What is claimed is:

1. A method of controlling a Packet Data Unit (PDU) session in a data communications network, the method comprising:
receiving, by a component of the data communications network, a Policy Control Function (PCF) request from a Session Management Function (SMF) of a 5G network, the component configured to implement interworking functionality between a Policy and Charging Rules Function (PCRF) of a 4G network and the SMF of the 5G network;
generating, by the component of the data communications network, a PCRF request based on the PCF request;
transmitting, by the component of the data communications network, the PCRF request to the PCRF via a Gx interface operable to enable 5G components to access the PCRF of the 4G network;
receiving, by the component of the data communications network, a PCRF request response from the PCRF via the PCRF interface;
generating, by the component of the data communications network, a PCF request response based on the PCRF request response; and
transmitting, by the component of the data communications network, the PCF request response to the SMF via an SMF interface.

2. The method of claim 1, wherein the component is an interworking function (IWF).

3. The method of claim 1, wherein the PCF request is received over an N7 interface and the PCF request response is transmitted over the N7 interface.

4. The method of claim 1, wherein the PCRF request is transmitted over a Gx interface and the PCRF request response is received over the Gx interface.

5. The method of claim 1, wherein the generating of the PCRF request comprises transforming the received PCF request.

6. The method of claim 1, wherein the generating of the PCF request response comprises transforming the received PCRF request response.

7. The method of claim 1, wherein the component of the data communications network is configured to communicate with the SMF as a PCF component over an N7 interface.

8. The method of claim 1, wherein the component of the data communications network is configured to communicate with to the PCRF as a Policy and Charging Enforcement Function (PCEF) over a Gx interface.

9. A system configured to implement interworking functionality between a Policy and Charging Rules Function (PCRF) of a 4G network and a Session Management Function (SMF) of a 5G network, the system comprising:
one or more processors; and
a memory in communication with the one or more processors, the memory having computer-readable instructions stored thereupon that, when executed by the one or more processors, cause the system to perform operations comprising:
receiving a Policy Control Function (PCF) request from a Session Management Function (SMF) of a 5G network;
generating a PCRF request based on the PCF request;
transmitting the PCRF request to the PCRF via a Gx interface operable to enable 5G components to access the PCRF of the 4G network;
receiving a PCRF request response from the PCRF via the PCRF interface;
generating a PCF request response based on the PCRF request response; and
transmitting the PCF request response to the SMF via an SMF interface.

10. The system of claim 9, wherein the operations are performed by an interworking function (IWF).

11. The system of claim 9, wherein the PCF request is received over an N7 interface and the PCF request response is transmitted over the N7 interface.

12. The system of claim 9, wherein the PCRF request is transmitted over a Gx interface and the PCRF request response is received over the Gx interface.

13. The system of claim 9, wherein the generating of the PCRF request comprises transforming the received PCF request.

14. The system of claim 9, wherein the generating of the PCF request response comprises transforming the received PCRF request response.

15. The system of claim 9, wherein the system is configured to communicate with the SMF as a PCF component over an N7 interface and communicate with to the PCRF as a Policy and Charging Enforcement Function (PCEF) over a Gx interface.

16. A non-transitory computer storage medium storing computer-readable instructions that when executed by a processor of a system, cause the system to:
receive a Policy Control Function (PCF) request from a Session Management Function (SMF) of a 5G network;
generate a PCRF request based on the PCF request;
transmit the PCRF request to the PCRF via a Gx interface operable to enable 5G components to access the PCRF of the 4G network;
receive a PCRF request response from the PCRF via the PCRF interface;
generate a PCF request response based on the PCRF request response; and
transmit the PCF request response to the SMF via an SMF interface.

17. The non-transitory computer storage medium of claim 16, wherein the PCF request is received over an N7 interface and the PCF request response is transmitted over the N7 interface.

18. The non-transitory computer storage medium of claim 16, wherein the PCRF request is transmitted over a Gx interface and the PCRF request response is received over the Gx interface.

19. The non-transitory computer storage medium of claim 16, wherein the generating of the PCF request response comprises transforming the received PCRF request response.

20. The non-transitory computer storage medium of claim 16, wherein the system is configured to communicate with the SMF as a PCF component over an N7 interface and communicate with to the PCRF as a Policy and Charging Enforcement Function (PCEF) over a Gx interface.

* * * * *